(12) United States Patent
Holloway et al.

(10) Patent No.: US 6,183,131 B1
(45) Date of Patent: Feb. 6, 2001

(54) LINEARIZED TEMPERATURE SENSOR

(75) Inventors: Peter R. Holloway, Andover, MA (US);
Ravi Subrahmayan, Windham; Gary S. Sheehan, Londonderry, both of NH (US)

(73) Assignee: National Semiconductor Corporation, Santa Clara, CA (US)

( * ) Notice: Under 35 U.S.C. 154(b), the term of this patent shall be extended for 0 days.

(21) Appl. No.: 09/281,637

(22) Filed: Mar. 30, 1999

(51) Int. Cl.[7] .................................................. G01K 7/14
(52) U.S. Cl. ......................... 374/172; 374/170; 327/512
(58) Field of Search ........................... 327/512; 374/163, 374/170, 171, 172, 178, 180

(56) References Cited

U.S. PATENT DOCUMENTS

| 3,300,710 | 1/1967 | Knauss . | |
|---|---|---|---|
| 3,829,717 | 8/1974 | Harrison | 307/297 |
| 3,851,241 | * 11/1974 | Wheatley, Jr. | 374/170 |
| 3,887,863 | 6/1975 | Brokaw | 323/19 |
| 3,916,508 | * 11/1975 | Conzelmann et al. | 374/178 |
| 4,068,134 | 1/1978 | Tobey et al. | 307/297 |
| 4,088,941 | 5/1978 | Wheatley | 323/8 |
| 4,099,115 | 7/1978 | Watanabe | 323/19 |
| 4,198,676 | * 4/1980 | Varnum et al. | 374/170 |
| 4,313,083 | 1/1982 | Gilbert et al. | 323/350 |
| 4,448,549 | * 5/1984 | Hashimoto et al. | 374/178 |
| 4,488,824 | 12/1984 | Salem | 374/181 |
| 4,607,962 | * 8/1986 | Nagao et al. | 374/170 |
| 4,665,356 | 5/1987 | Pease | 323/314 |
| 5,094,546 | 3/1992 | Tsuji | 374/178 |
| 5,448,158 | * 9/1995 | Ryat | 327/512 |
| 5,519,354 | 5/1996 | Audy | 327/512 |
| 5,629,612 | 5/1997 | Schaffer | 323/313 |
| 5,973,528 | * 10/1999 | Halamik et al. | 327/512 |

FOREIGN PATENT DOCUMENTS

0974146 * 11/1982 (SU) .................................... 374/170

OTHER PUBLICATIONS

Gray, Paul R. and Robert G. Meyer, *Analysis and Design of Analog Integrated Circuits*, 2nd ed., John Wiley & Sons, New York, NY, 1984, pp. 289–296.

* cited by examiner

Primary Examiner—G. Bradley Bennett
Assistant Examiner—Gail Verbitsky
(74) Attorney, Agent, or Firm—Skjerven Morrill MacPherson LLP; Edward C. Kwok; Michael J. Halbert (57) ABSTRACT

A temperature sensor corrects the parabolic curvature error in the output signal without attempting to linearize the reference voltage itself. A temperature sensor produces a temperature output signal that is a function of the ratio of a temperature dependent voltage to a reference voltage. The temperature sensor uses a nonlinear reference voltage, e.g., the reference voltage conforms to a curve with an approximately hyperbolic shape over a temperature range, so that the ratio of the temperature dependent voltage to the hyperbolic reference voltage will be linear. The hyperbolic reference voltage is generated by summing a reference voltage with an appropriate temperature dependent voltage. The "gain" or slope of the ratio is altered by adjusting a scaling factor. Finally, the offset of the ratio is adjusted so that the temperature sensor produces the appropriate output signal at ambient temperature. Thus, despite the present of curvature in the reference voltage of the temperature sensor, a highly linear and accurate temperature sensor may be constructed using the hyperbolic linearization technique without requiring complex or expensive reference voltage correction circuits.

25 Claims, 6 Drawing Sheets

LINEARIZED TEMPERATURE SENSOR

FIELD OF THE INVENTION

The present invention relates to a digital temperature sensor and in particular to the linearization of the temperature measurement produced by a digital temperature sensor.

BACKGROUND

Digital temperature sensors are well known. Digital temperature sensors are typically used to generate a temperature reference for the circuits on the chip or other integrated chips.

Digital temperature sensors, such as voltage reference circuits, generate a temperature output signal by normalizing a thermometer voltage $V_{TEMP}$, which is temperature dependent, to a reference voltage $V_{REF}$. The analog to digital converter of the digital temperature sensor measures the temperature dependent voltage ratiometrically relative to the reference voltage. Thus, the output temperature signal of a digital temperature sensor can be expressed as follows:

$$F(T) = \frac{V_{TEMP}}{V_{REF}} \quad \text{equ. 1}$$

where F(T) is the thermometer transfer function, $V_{TEMP}$ is the temperature dependent thermometer voltage, and $V_{REF}$ is the reference voltage.

The reference voltage $V_{REF}$ is typically generated by a bandgap reference voltage circuit. As is well known in the art, a bandgap reference voltage $V_{REF}$ has two component voltages: a $C^*\Delta V_{BE}(T)$ term, which is the scaled difference between two base emitter voltages and is proportional to absolute temperature (PTAT), and a $V_{BE}(T)$ term, which is one base emitter voltage. When these two component voltages, which have opposite and nearly equal temperature coefficients, are summed together correctly, as follows:

$$V_{REF} = V_{BE}(T) + C \times \Delta V_{BE}(T), \quad \text{equ. 1a}$$

the resulting reference voltage $V_{REF}$ is nearly temperature independent. Unfortunately, there are second order errors intrinsic to the $V_{BE}(T)$ term that precludes the reference voltage from being truly temperature independent.

Figure 1:
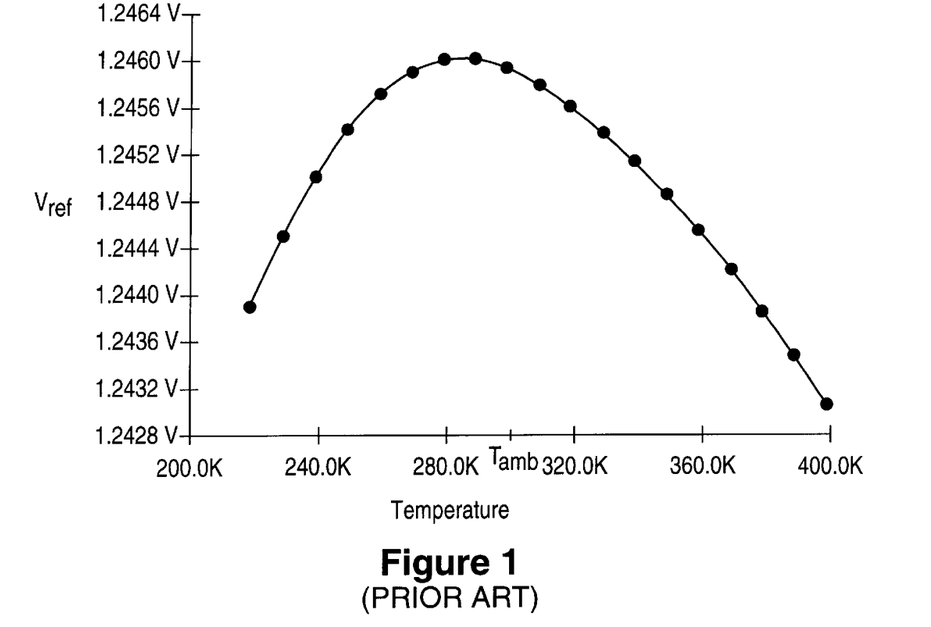
FIG. 1 is a graph showing the well-known temperature dependence of a reference voltage $V_{REF}$ generated by a conventional bandgap reference voltage circuit.

The reference voltage $V_{REF}$ can be expressed as a function of a physical constant, several device parameters, and, typically a single user driven parameter that determines the entire voltage-vs.-temperature characteristics of any conventional bandgap reference. The equation that expresses these relationships, which is derived by expansion of equation 1a, is the well-known Standard Model and is shown below:

$$V_{REF} = V_{GO} + \gamma T\left(1 + \ln\frac{T_0}{T}\right); \text{ where } \gamma \equiv \frac{k}{q}[4 - \alpha - \eta] \quad \text{equ. 2}$$

where $V_{GO}$) is the so called "extrapolated bandgap voltage," $\gamma$ is a combined process, device, and operating current temperature coefficient variable, $\alpha$ and $\eta$ are device dependent parameters, and $T_0$ is the user selectable parameter that defines the temperature at which $V_{REF}$, reaches a peak value. Note that $T_0$ can be altered by adjusting the scaling factor C in equation 1a. When $T_0$ is chosen to occur at ambient temperature, i.e., $T_0=T_{amb}$, which is the convention in the prior art, the resulting reference voltage $V_{REF}$ has a parabolic curvature as shown in FIG. 1. For more information relating to bandgap reference voltages and equation 2, see Gray & Meyer, "Analysis and Design of Analog Integrated Circuits," 289–96 (John Wiley & Sons, 2nd ed. 1984), which is incorporated herein by reference.

FIG. 1 is a graph showing the well-known temperature dependence of a reference voltage $V_{REF}$ generated by a bandgap reference voltage circuit without additional correction circuitry. As shown in FIG. 1, the non-linear curvature of reference voltage $V_{REF}$ is parabolic over the operational temperature range, i.e., between temperatures 220° K and 400° K. Voltage reference circuits are conventionally trimmed to minimize reference voltage errors by adjusting $T_0$ so that the peak value of the reference voltage $V_{REF}$ occurs at ambient temperature $T_{amb}$, approximately 300° K, as shown in FIG. 1. By assuring that the peak of voltage $V_{REF}$ is at ambient temperature $T_{amb}$, the parabolic curvature of the reference voltage is approximately symmetrical about the peak value within the operational temperature range.

Conventionally, a pair of bipolar transistors forced to operate at a fixed non-unity current density ratio is used to generate a $\Delta V_{BE}(T)$ term, which is then scaled by C to produce the $V_{TEMP}$ term. The $\Delta V_{BE}(T)$ term is the difference between two base-emitter voltages, e.g., $V_{BE1}$ and $V_{BE2}$, of two diodes or transistors operating at a constant ratio between their collector-current densities, where collector-current densities are defined as the ratio between the collector current to the emitter size. Thus, $\Delta V_{BE}(T)$ can be expressed accordingly:

$$\Delta V_{BE}(T) = V_{BE1} - V_{BE2} \quad \text{equ. 3}$$

where:

$$\Delta V_{BE}(T) = \frac{kT}{q}\ln\left(\frac{J_1}{J_2}\right) \quad \text{equ. 4}$$

and $V_{BE1}$ and $V_{BE2}$ are the respective base-emitter voltages of a two transistors or diodes, k is Boltzman's constant, T is the absolute temperature (°K), q is the electronic charge, $J_1$ and $J_2$ are the respective current densities in two transistors or diodes, the ratio of which is intended to be fixed with regard to temperature.

As can be seen in equation 4, under the above conditions, the $\Delta V_{BE}(T)$ term is precisely linear with temperature. The temperature dependent thermometer voltage $V_{TEMP}$ is generated by combining the $\Delta V_{BE}(T)$ term with a scaling factor C as follows.

$$V_{TEMP} = \Delta V_{BE}(T) \times C == C\beta T; \text{ where } \beta \equiv \frac{k}{q}\ln\left(\frac{J_1}{J_2}\right) \quad \text{equ. 5}$$

Figure 2:
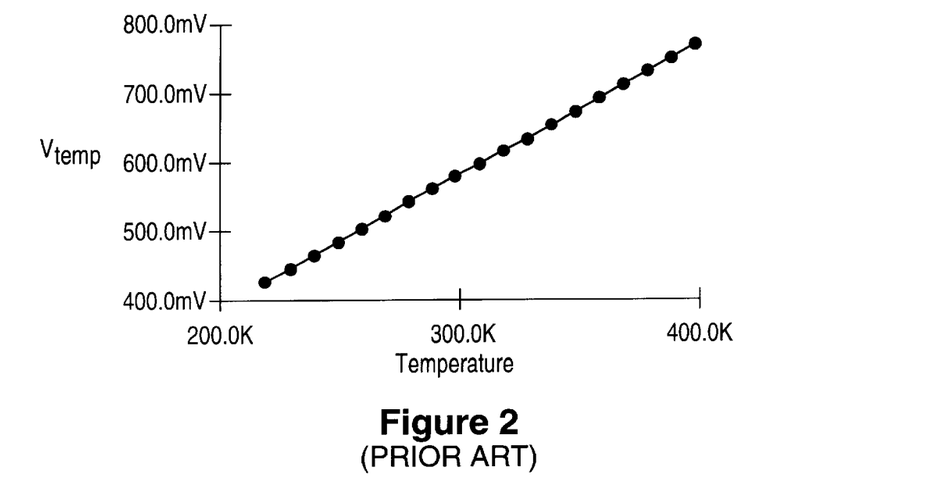
FIG. 2 is a graph showing the linearly-temperature-dependent voltage $V_{TEMP}$ generated by a conventional bandgap reference voltage circuit.

The scaling factor C is typically used to amplify and adjust the value of the temperature dependent voltage $V_{TEMP}$. FIG. 2 is a graph showing a temperature dependent voltage thermometer $V_{TEMP}$ generated by a circuit consisting of a pair of bipolar transistors operating at a fixed non-unity current density ratio to produce a $\Delta V_{BE}$, which is then scaled by C.

It is necessary to distinguish here between the thermometer voltage $V_{TEMP}$, which is produced in this example by the scaled $\Delta V_{BE}$ from two bipolar devices, and the $\Delta V_{BE}$ term in equation 1a, which is a component of $V_{REF}$. Both are produced by the same mechanism in this example, i.e., by a pair of bipolar transistors, but they are not the same voltage. They may be from different pairs of bipolar devices in one embodiment of this invention, or may be produced from a single pair of bipolar devices, as an engineering choice, in another embodiment of this invention. In the following description, the term $V_{TEMP}$ is used to refer strictly to the thermometer voltage, which may or may not be reused to adjust the reference voltage $V_{REF}$. Additionally, the thermometer voltage $V_{TEMP}$ may be produced by other means, and not only by the use of a pair of bipolar transistors, as discussed elsewhere in the present disclosure.

Combining equations 2 and 5 completes the right hand side of equation 1. Now, the thermometer transfer function F(T) for a conventional temperature sensor may be expressed as:

$$F(T) = \frac{C\beta T}{V_{GO} + \gamma T\left(1 + \ln\frac{T_0}{T}\right)}. \qquad \text{equ. 6}$$

Figure 3:
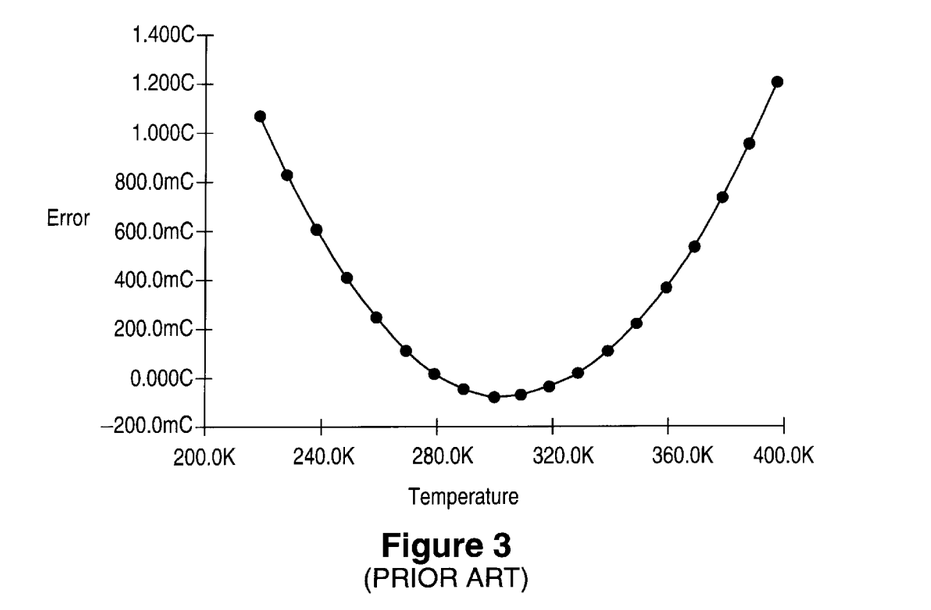
FIG. 3 is a graph showing the temperature error of a conventional digital temperature sensor generated by the ratio of the temperature dependent thermometer voltage $V_{TEMP}$ to the reference voltage $V_{REF}$.

Because a digital temperature sensor system divides the precisely linear voltage $V_{TEMP}$ by the reference voltage $V_{REF}$, which has a parabolic curvature error, the thermometer transfer function F(T) of the digital temperature sensor system has a corresponding but inverted parabolic curvature error. FIG. 3 is a graph showing the temperature error in the thermometer transfer function F(T) generated by a conventional temperature sensor, which uses the ratio of $V_{TEMP}$ to $V_{REF}$ as stated in equation 1. As shown in FIG. 3, the resulting error of the temperature output signal is a non-linear curve that is the inverse of the parabolic reference voltage $V_{REF}$, shown in FIG. 1.

Figure 4:
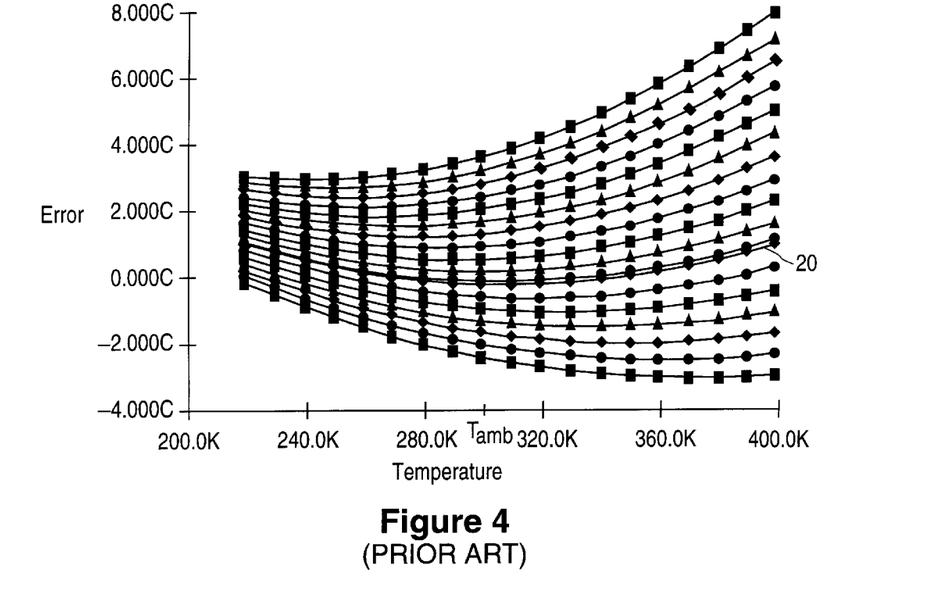
FIG. 4 is a graph showing temperature errors produced by eighteen uncorrected digital temperature sensors.

Because of individual part errors, each digital temperature sensor will generate a different amount of error at ambient temperature $T_{amb}$. Thus, individual digital temperature sensors are adjusted through conventional trimming such that there is a minimal error in the temperature output signal $T_{OUT}$(C) at the ambient temperature $T_{amb}$. FIG. 4 is a graph showing temperature errors produced by eighteen non-trimmed digital temperature sensors. As can be observed in FIG. 4, when a digital temperature sensor has no error at ambient temperature $T_{amb}$, e.g., when the digital temperature sensor requires no trimming or is trimmed to compensate for error at ambient temperature $T_{amb}$, the familiar parabolic curve 20 is generated. The parabolic error curve 20 shown in FIG. 4 is similar to the error curve shown in FIG. 3 (with a different scale along the Y axis). Thus, despite trimming the digital temperature sensor to compensate for error at ambient temperature $T_{amb}$, the digital temperature sensor will still produce an error at non-ambient temperatures.

Figure 5:
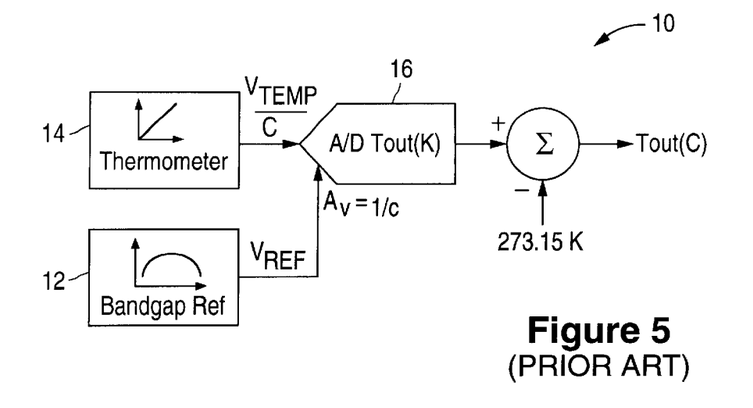
FIG. 5 is a schematic diagram of a conventional digital temperature sensor.

FIG. 5 is a schematic diagram of a conventional monolithic digital temperature sensor 10. Temperature sensor 10 uses a bandgap reference voltage circuit 12 that generates a bandgap voltage reference $V_{REF}$ in accordance with equation 2 above. Temperature sensor also uses a thermometer circuit 14 to generate the linearly-temperature-dependent voltage $V_{TEMP}/C$ as described above in reference to equation 5. Thermometer circuit 14 is typically an additional pair of transistors or diodes operating in accordance with equation 5.

The bandgap reference voltage $V_{REF}$ is used to normalize the linearly-temperature-dependent voltage, $V_{TEMP}/C$ as produced by thermometer circuit 14. An analog to digital (A/D) converter 16 computes a digital fraction representing the ratio of $V_{TEMP}/C$ to $V_{REF}/C'$, where C' is nominally equal to C, to a resolution of N bits and produces a temperature output signal $T_{OUT}$(K) in degrees Kelvin. The Kelvin equivalent of 0° Centigrade, i.e., 273.15° K, is subtracted from the temperature output signal $T_{OUT}$(K) produced by A/D converter 16 at summing block 18. Thus, summing block 18 produces a temperature output signal $T_{OUT}$(C) in degrees Centigrade. The temperature output signal $T_{OUT}$(C) produced by digital temperature sensor 10 can therefore be expressed as follows.

$$T_{OUT}(C) = T_{FS}\left[\frac{V_{TEMP}}{V_{REF}}\right] - 273.15° \text{ K}. \qquad \text{equ. 7}$$

where $T_{FS}$ is the full scale digital output of the converter in Kelvin.

As discussed above, the temperature output signal $T_{OUT}$(C) generated by digital temperature sensor 10 will include the parabolic error term, which is essentially the inverse of the characteristic downward facing parabolic error produced by the uncorrected bandgap reference voltage circuit 12. Conventional techniques, such as polynomial curvature correction, much greater than unity collector current temperature slopes, and non-linear resistor compensation, are typically used to mitigate the parabolic error term in the temperature output signal $T_{OUT}$(C) by attempting to "flatten" the bandgap voltage reference $V_{REF}$. Thus, errors in digital temperature sensors are conventionally corrected in the prior art by introducing additional complex temperature dependent circuitry that modifies the behavior of bandgap reference circuit 12. Unfortunately, such complex temperature dependent circuitry requires additional die area, consumes more power, increases both manufacturing and trimming complexities, and adversely affects reliability.

Thus, what is needed is a digital temperature sensor with improved error that does not require additional circuitry to correct the bandgap curvature voltage.

SUMMARY

The temperature output signal from a digital temperature sensor is linearized by modifying the reference voltage to be nonlinear over a specific temperature range such that the final temperature output is linear, instead of attempting to linearize the reference voltage. In one embodiment, the reference voltage is modified to approximate a so-called hyperbolic curve over a temperature range. While the exact curvature of the reference voltage is mathematically complex, for ease of reference the reference voltage curvature will be described hereinafter as "nonlinear" or "hyperbolic" interchangeably. However, it should be understood that the reference voltage curvature, as defined in equation 13a herein, may not, and indeed need not, precisely conform to any specific family of hyperbolic curves. The hyperbolically linearized digital temperature sensor generates a temperature dependent voltage and a reference voltage that is modified to be approximately hyperbolic. The hyperbolically linearized digital temperature sensor then generates the temperature output signal based on a scaled ratio of these two voltages with an additional temperature offset correction term.

The desired nonlinear reference voltage is produced by summing a reference voltage with a temperature dependent voltage to produce a reference voltage with the desired curvature. The appropriate temperature dependent voltage to be summed with the reference voltage produces a peak value of the nonlinear reference voltage that is at a non-ambient temperature. The optimum temperature for the peak value of the so-called hyperbolic reference voltage is found by setting the second derivative of the thermometer transfer function of equation 6 with respect to temperature equal to zero.

The use of this particular nonlinear reference voltage produces a linearized temperature output signal, but the "gain" or slope of the temperature output signal, as well as the offset, are affected. The slope and offset of the temperature output signal are adjusted to new target values that would be inappropriate for non-hyperbolically compensated digital temperature sensor systems. The slope of the temperature output signal may be corrected by using a scaling factor found by setting the first derivative of the thermometer transfer function with respect to temperature equal to one. The appropriate temperature offset correction term of the temperature sensor can then be determined by appropriately adjusting the temperature sensor at ambient temperature.

Thus, the temperature sensor includes a reference voltage circuit that produces a reference voltage and a thermometer circuit that produces a temperature dependent correction voltage. The reference voltage and correction voltage are summed with a summing circuit to generate the hyperbolic reference voltage. The hyperbolic reference voltage is scaled by an amplifier circuit. A normalizing circuit, such as an analog to digital converter circuit normalizes a temperature dependent voltage as a ratio with the scaled hyperbolic reference voltage. An additional digital summing circuit is used to add the temperature offset correction term to generate a corrected temperature output signal.

With the use of hyperbolic linearization, the temperature sensor produces a highly linear and accurate temperature output signal despite the presence of curvature in the reference voltage. Because of the hyperbolic nature of the curvature of the modified reference voltage that is being exploited to produce the linear temperature output signal, there is no need to attempt to flatten the reference voltage curvature. Consequently, a digital temperature sensor system, including a conventional imperfect bandgap reference circuit, may be used to generate an ideal or nearly ideal temperature output signal without complex circuitry to correct for the reference voltage curvature.

BRIEF DESCRIPTION OF THE DRAWINGS

The above and other features, aspects, and advantages of the present invention will become better understood with regard to the following description, appended claims, and accompanying figures, where:

DETAILED DESCRIPTION

A digital temperature sensor in accordance with an embodiment of the present invention produces a temperature output signal with little curvature error using a hyperbolic linearization method and corresponding structure Hyperbolic linearization does not attempt to linearize the reference voltage $V_{REF}$, but instead reduces the curved temperature error by exploiting the relationship of the temperature dependent thermometer voltage $V_{TEMP}$ and the reference voltage $V_{REF}$ ratio used by digital temperature sensors.

An embodiment of the present invention relates to any temperature sensor that uses the equivalent to the ratio of the temperature dependent thermometer voltage $V_{TEMP}$ to the reference voltage $V_{REF}$ to generate a temperature output signal. By way of an example, the present discussion will address a digital temperature sensor that uses a bandgap reference voltage circuit to generate the reference voltage. However, as will be understood by those of ordinary skill in the art, any temperature sensor that uses a reference voltage $V_{REF}$ may be used in an embodiment of the present invention.

A conventional bandgap voltage reference temperature sensor produces a temperature output signal expressed as the thermometer transfer function F(T) below by normalizing a temperature dependent thermometer voltage $V_{TEMP}$ with a reference voltage $V_{REF}$ as follows:

$$F(T) = \frac{V_{TEMP}}{V_{REF}} = \frac{C\beta T}{V_{GO} + \gamma T\left(1 + \ln\frac{T_0}{T}\right)} \qquad \text{equ. 8}$$

The numerator of equation 8, the linear temperature dependent thermometer voltage $V_{TEMP}$, may be generated in a number of ways, well known to those skilled in the art. For example, in a bandgap reference voltage circuit, voltage $V_{TEMP}$ is generated as a function of the difference $\Delta V_{BE}$ between two base-emitter voltages $V_{BE1}$ and $V_{BE2}$, where as seen in equation 5, $\Delta V_{BE}$ is kT/q multiplied by ln(J1/J2). The temperature dependent thermometer voltage $V_{TEMP}$ is proportional to absolute temperature.

Figure 6:
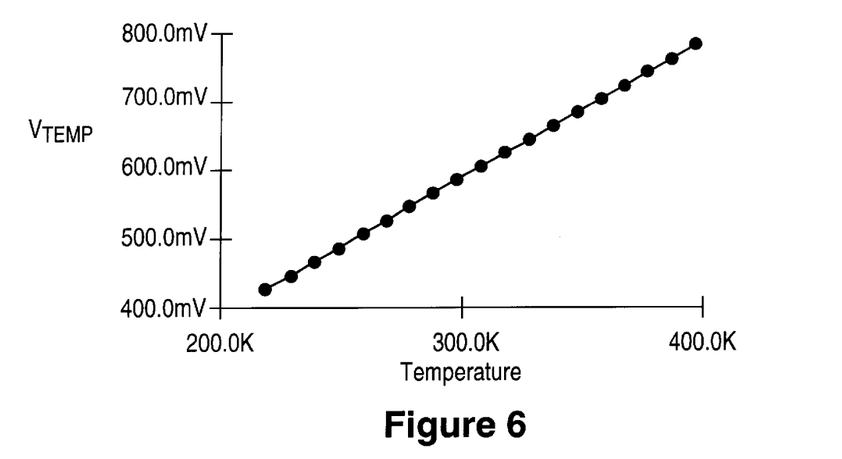
FIG. 6 is a graph showing the temperature dependent thermometer voltage $V_{TEMP}$.

FIG. 6 is a graph showing the temperature dependent thermometer voltage $V_{TEMP}$ with respect to temperature, where the Y axis represents $V_{TEMP}$ and the X axis represents temperature.

Of course, generating a thermometer voltage $V_{TEMP}$ with a $\Delta V_{BE}$ diode pair is merely one way of generating a linear temperature dependent voltage. Many other circuits may be used to generate a linearly-temperature-dependent voltage, including, but not limited to: resistance temperature dependent resistors, thermocouples, Zener diodes, and avalanche Zener diodes. Circuits using such devices and proper conditioning of the signals to produce a linear temperature dependent voltage is well known to those of ordinary skill in the art.

In an ideal temperature sensor, the thermometer transfer function F(T) of equation 8 will have the constraints that its curve will pass through a point of origin (or a desired calibration point) and the ambient temperature $T_{amb}$ and that the line passing through these two points will be linear. To approximate an ideal temperature sensor, the linearization technique in accordance with an embodiment of the present invention satisfies the above constraints that describe the ideal temperature sensor. Consequently, there are three conditions that may be expressed mathematically as follows:

(a) $\quad \dfrac{d^2}{dT^2} F(T_{CAL}) \to 0 \qquad$ equ. 9

(b) $\quad \dfrac{d}{dT} F(T_{CAL}) \to 1 \qquad$ equ. 10

(c) $\quad F(T_{CAL}) - T_{CAL} \to 0 \qquad$ equ. 11 where $T_{CAL}$ is the calibration temperature. If the second derivative of F(T) is continuous, there is a temperature $T_{CAL}$, (for a given value of $\gamma$ from equation 8), that drives the second derivative of F(T) to zero. If there is a $T_{CAL}$ that will drive the second derivative of F(T) to zero, the second order curvature of F(T) would be canceled, despite the reference voltage $V_{REF}$ remaining parabolic. It should be noted that where $T_{AMB}$ is set close to, but not identically equal to, $T_{CAL}$ the second order curvature of F(T) will still be adequately small for purposes of the present invention.

From equations 8, 9, and 10, the first and second derivatives of F(T) with respect to temperature T are as follows:

$$\dfrac{d}{dT} F(T) = \dfrac{F(T)}{T} \left[ \dfrac{V_{GO} + \gamma T}{V_{GO} + \gamma T \left(1 + \ln \dfrac{T_0}{T}\right)} \right], \qquad \text{equ. 11}$$

or $$\dfrac{d}{dT} F(T) = \left[\dfrac{F(T)}{T}\right]^2 \left[\dfrac{V_{GO} + \gamma T}{C\beta}\right], \qquad \text{equ. 11a}$$

and $$\dfrac{d^2}{dT^2} F(T) = \left[\dfrac{F(T)}{T}\right]^2 \left[\dfrac{\gamma}{C\beta}\right] \left[\dfrac{V_{GO}\left(1 - 2\ln\dfrac{T_0}{T}\right) + \gamma T\left(1 - \ln\dfrac{T_0}{T}\right)}{V_{GO} + \gamma T\left(1 + \ln\dfrac{T_0}{T}\right)}\right], \qquad \text{equ. 12}$$

or $$\dfrac{d^2}{dT^2} F(T) = \left[\dfrac{F(T)}{T}\right]^3 \left[\dfrac{\gamma}{(C\beta)^2}\right] \left[V_{GO}\left(1 - 2\ln\dfrac{T_0}{T}\right) + \gamma T\left(1 - \ln\dfrac{T_0}{T}\right)\right]. \qquad \text{equ. 12a}$$

Setting the second derivative of F(T) equal to zero, the value of temperature $T_0$ that results is:

$$T_0 = (T_{CAL}) \exp\left[\dfrac{V_{GO} + \gamma T_{CAL}}{2V_{GO} + \gamma T_{CAL}}\right] \qquad \text{equ. 13}$$

where $T_{CAL}$ is the calibration temperature. Thus, setting equation 12a to zero results in a second order curvature correction that eliminates the parabolic error of the digital temperature sensor and condition (a) from equation 9 is achieved.

Inserting temperature $T_0$ from equation 13 into equation 2 will generate a nonlinear reference voltage $V_{HREF}$.

$$V_{HREF} = V_{GO} + \gamma T \left(1 + \left(\dfrac{V_{GO} + \gamma T_{CAL}}{2V_{GO} + \gamma T_{CAL}}\right) + \ln\dfrac{T_{CAL}}{T}\right) \qquad \text{equ. 13a}$$

It may be useful to describe the nonlinear reference voltage $V_{HREF}$ curvature as hyperbolic or approximately hyperbolic because the curvature has at least some characteristics similar to a hyperbolic function. For example, although the curve described by the hyperbolic reference voltage $V_{HREF}$ is itself non-linear, the use of the hyperbolic reference voltage $V_{HREF}$ in the denominator of the thermometer transfer function F(T) of equation 8 will generate a linear result. Thus, for ease of reference the nonlinear reference voltage $V_{HREF}$ will be described hereinafter as "hyperbolic" reference voltage $V_{HREF}$.

Figure 7:
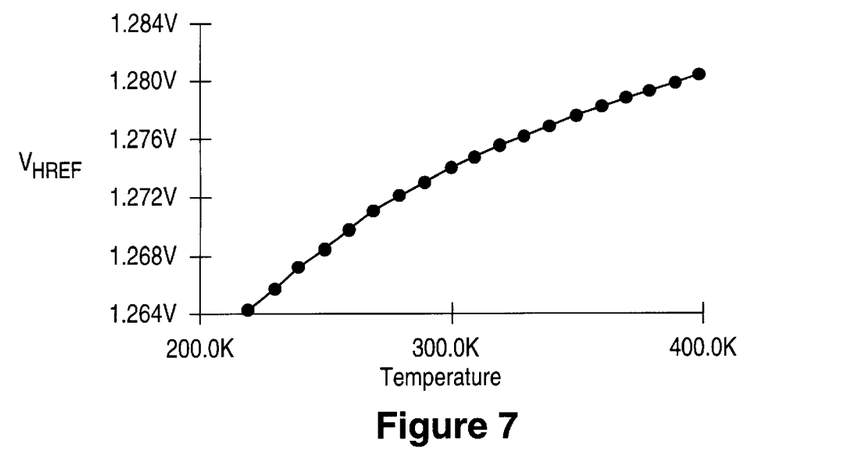
FIG. 7 is a graph showing a hyperbolic reference voltage $V_{HREF}$.

The typical value of temperature $T_0$ from equation 13 is approximately 500° C., but may vary slightly depending on the specific parameters of the devices being used. When the typical value of temperature $T_0$, i.e., 500° C., is used in equation 2 to generate the hyperbolic reference voltage $V_{HREF}$, the value of $\ln(T_0/T)$ will not go to zero when T is equal to $T_{CAL}$, but instead will be approximately 0.5. The presence of a non-zero third term in equation 2, tilts the hyperbolic reference voltage $V_{HREF}$ curve so that the total curve is a sum of a ramp and a parabola as seen in FIG. 7. Consequently, in implementation of the thermometer circuit, the hyperbolic reference voltage $V_{HREF}$ can be produced by summing a reference voltage $V_{REF}$, which has a parabolic error curvature, with a temperature dependent thermometer voltage $\alpha^* V_{TEMP}$, such that the hyperbolic reference voltage $V_{HREF}$ has a peak value at temperature $T_0$ as defined in equation 13.

FIG. 7 is a graph showing a hyperbolic reference voltage $V_{HREF}$ with a peak value at temperature $T_0$ displaced to approximately 500° C. As shown in FIG. 7, the reference voltage $V_{HREF}$ is not itself linearized, but has a strong positive temperature coefficient. Although the reference voltage $V_{HREF}$ would be considered a poorly performing reference voltage by conventional standards, the reference voltage $V_{HREF}$ curve shown in FIG. 7 approximates one embodiment of the hyperbolic curvature used in the hyperbolic linearization technique of the present invention. It should be understood that FIG. 7 illustrates only one possible curvature of reference voltage $V_{HREF}$, and that many other possible curvatures are possible depending on the specific device parameters used.

Although the use of hyperbolic reference voltage $V_{HREF}$ in the thermometer transfer function F(T) generates a linear result, the hyperbolic reference voltage $V_{HREF}$ may create errors in the "gain" or slope as well as in the offset of the curve of the thermometer transfer function F(T).

Satisfying condition (b) of equation 10 will ensure that the curve of thermometer transfer function F(T) will have the proper "gain" or slope. Thus, satisfying condition (b) of equation 10 is necessary to produce a temperature output signal that will change in direct relation to changes in temperature. From equation 10, the quantity $C\beta$ should be:

$$C\beta_{CAL} = \dfrac{\left[V_{GO} + \gamma T_{CAL}\left(1 + \ln\dfrac{T_0}{T_{CAL}}\right)\right]^2}{V_{GO} + \gamma T_{CAL}} \qquad \text{equ. 14}$$

where $\beta_{CAL}$ is the value of $k/q^* \ln(J_1/J_2)$ when the temperature is set at the calibration temperature $T_{CAL}$. From inspection of equation 14, it can be seen that $C\beta_{CAL}$ is a constant. Thus, the appropriate value of scaling factor C can be included in the thermometer transfer function using an amplifier circuit.

By solving equation 13 for the quantity $\ln(T_0/T_{CAL})$, equation 14 can be reduced to:

$$C\beta_{CAL} = \frac{4(V_{GO} + \gamma T_{CAL})^3}{(2V_{GO} + \gamma T_{CAL})^2} \quad \text{equ. 15}$$

The quantity $C\beta_{CAL}$ may then be inserted into the numerator of equation 8. With conditions (a) and (b) from respective equations 9 and 10 met, the thermometer transfer function F(T) has two properties at $T=T_{CAL}$; the slope of F(T) is precisely 1.00° C./° C., and the curvature of F(T) around $T=T_{CAL}$ is zero and it is usefully near zero at all normal operating temperatures. Thus, the thermometer transfer function F(T) will have a curve that is linear (to within small third order effects) and will have the desired slope. However, the curve of thermometer transfer function F(T) may not pass through the origin or any other desired calibration point. Consequently, an offset correction term is needed pursuant to condition (c) of equation 11.

Evaluating the thermometer transfer function of equation 8 at $T=T_{CAL}$, using the $T_0$ term from equation 13 and the $C\beta$ term from equation 15, results in an offset of approximately 6 to 7 degrees C for typical process values. Accordingly, an offset correction term K is added to the thermometer transfer function F(T). Consequently, the thermometer transfer function of equation 8 is modified to create the final hyperbolic thermometer transfer function H(T), accordingly:

$$H(T) = \frac{V_{TEMP}}{V_{HREF}} + K = \frac{C\beta_{CAL}T}{V_{GO} + \gamma T\left(1 + \ln\frac{T_0}{T}\right)} + K \quad \text{equ. 16}$$

where $T_o$ is the value derived in equation 13, and $C\beta_{CAL}$ is the value derived in equation 15.

Equation 16 can be solved for the offset correction term K at $T=T_{CAL}$ by setting $H(T_{CAL})-T_{CAL}=0$ to satisfy condition (c) as set forth in equation 11. The value of the offset correction term K is found to be:

$$K = \frac{\gamma(T_{CAL})^2}{2V_{GO} + \gamma T_{CAL}} \quad \text{equ. 17}$$

The correction term K is then inserted back into equation 16 to generate the final form of the fully linearized and calibrated hyperbolic thermometer transfer function H(T), accordingly:

$$H(T) = \quad \text{equ. 18}$$

$$\frac{4T(V_{GO} + \gamma T_{CAL})^3}{(2V_{GO} + \gamma T_{CAL})^2\left[V_{GO} + \gamma T\left(1 + \left(\frac{V_{GO} + \gamma T_{CAL}}{2V_{GO} + \gamma T_{CAL}}\right) + \ln\frac{T_{CAL}}{T}\right)\right]} + \frac{\gamma(T_{CAL})^2}{2V_{GO} + \gamma T_{CAL}}.$$

Figure 8:
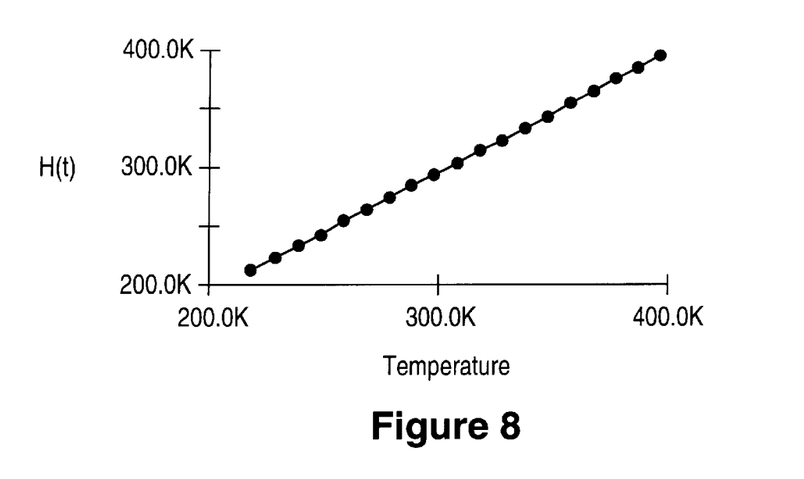
FIG. 8 is a graph showing the hyperbolic transfer function H(T), which is a function of the ratio of the temperature dependent thermometer voltage $V_{TEMP}$ over the hyperbolic reference voltage $V_{HREF}$.

FIG. 8 is a graph showing the hyperbolic thermometer transfer function H(T), which is a ratio of the conventionally generated temperature dependent thermometer voltage $\alpha^*V_{TEMP}$ and the hyperbolic reference voltage $V_{HREF}$ with the proper slope and offset corrections according to equation 18. As can be seen in FIG. 8, the resulting curve is linear, passes through ambient temperature, i.e., 300° K, and is proportional to absolute temperature.

Figure 9:
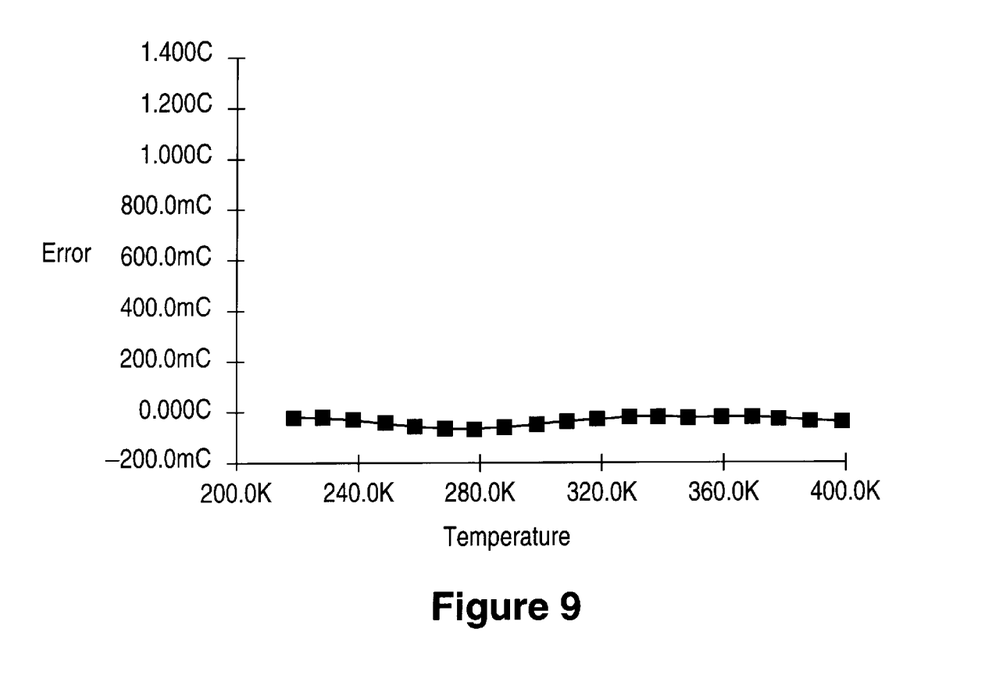
FIG. 9 is a graph showing the temperature output error of a hyperbolically linearized temperature sensor.

FIG. 9 is graph showing the temperature error of a digital temperature sensor that has been hyperbolically linearized in satisfaction of conditions (a), (b), and (c) as set forth in equations 9 through 11. As shown in FIG. 9, the temperature error across the entire operational temperature range is minimal, thus illustrating the robustness of the hyperbolic linearization technique in comparison to the temperature error of a conventional temperature sensor, shown in FIG. 3.

Figure 10:
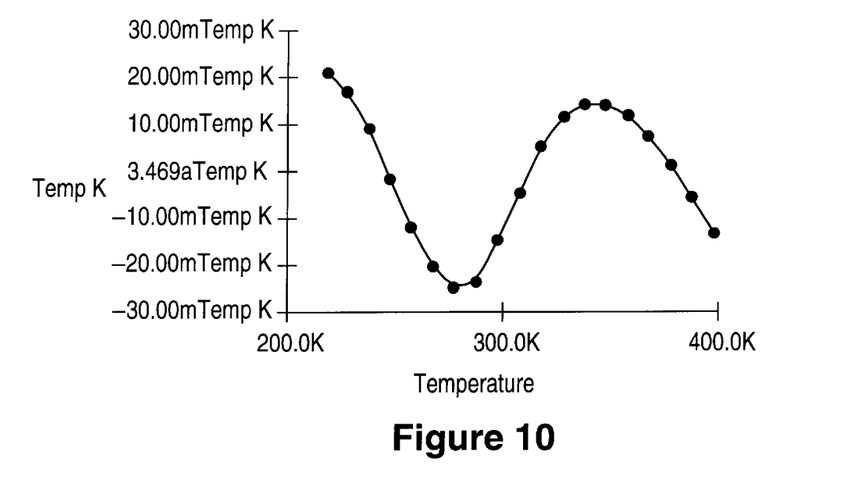
FIG. 10 is an expanded version of the graph in FIG. 9, showing in greater detail the temperature error of a hyperbolically linearized temperature sensor.

FIG. 10 is an expanded version of the graph in FIG. 9, showing in greater detail the temperature error of a hyperbolically linearized temperature sensor that satisfies conditions (a), (b), and (c) as set forth in equations 9 through 11, where the Y axis represents the temperature error and the X axis represents temperature. As shown in FIG. 10, the parabolic error of conventional temperature sensors is eliminated resulting in a output signal with an error of approximately +/−0.025° C. over the operating range.

Figure 11:
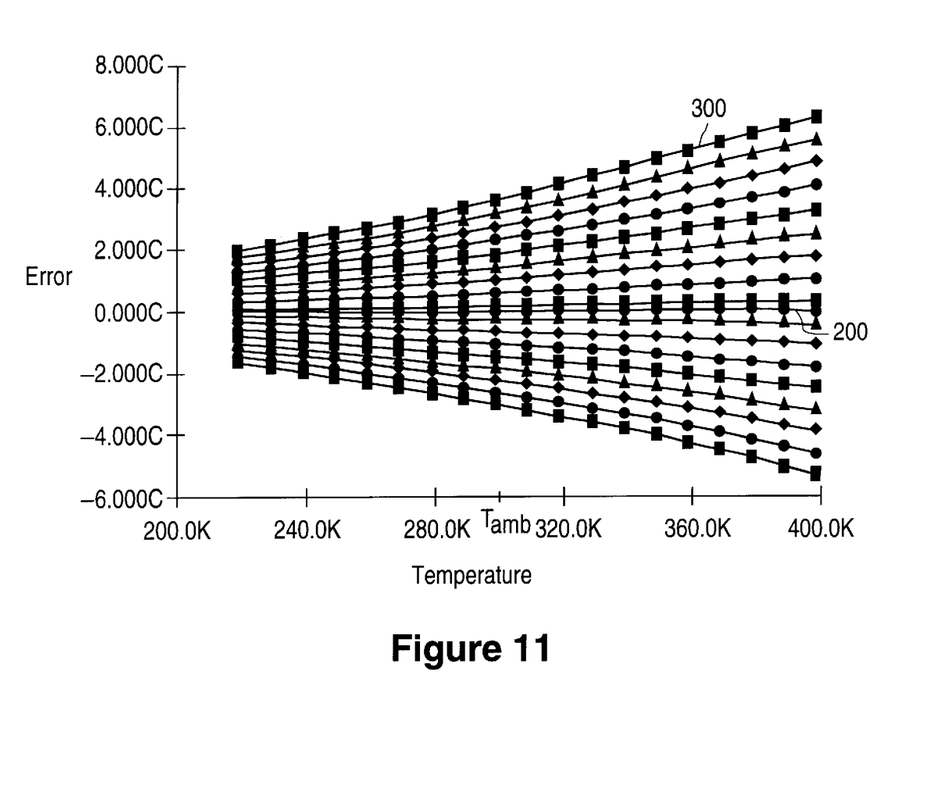
FIG. 11 is a graph illustrating the temperature output errors of several hyperbolically linearized temperature sensors without a temperature correction offset term.

FIG. 11 is a graph illustrating the temperature errors of eighteen individual hyperbolically linearized temperature sensors prior to correcting the offset term. The Y axis is the error of the hyperbolically linearized thermometer transfer function H(T) (without the temperature correction offset term) and the X axis is temperature. Each curve in FIG. 11 illustrates the error in the hyperbolic thermometer transfer function H(T) of an individual temperature sensor prior to correcting for variances in the performance of the devices. With a proper offset correction term, as explained in reference to equation 17, a temperature sensor may produce approximately zero error at ambient temperature $T_{amb}$. A temperature sensor with approximately zero error at ambient temperature $T_{amb}$ will produce an error curve 200, which has very little error across the operational temperature range. However, without a proper offset correction term, a hyperbolically linearized temperature sensor will still produce an error curve, for example curve 300, with a large amount of absolute temperature output error throughout the operating range. Thus, as shown in FIG. 11, the temperature offset correction term is necessary to minimize temperature error. FIG. 11 shows a range of temperature errors produced by digital temperature sensors prior to offset correction. As can be seen in FIG. 11, with the proper offset correction, a flat curvature may be generated. In comparison, FIG. 4 shows that there is no offset correction that will produce a flat curvature with a conventional digital temperature sensor.

Figure 12:
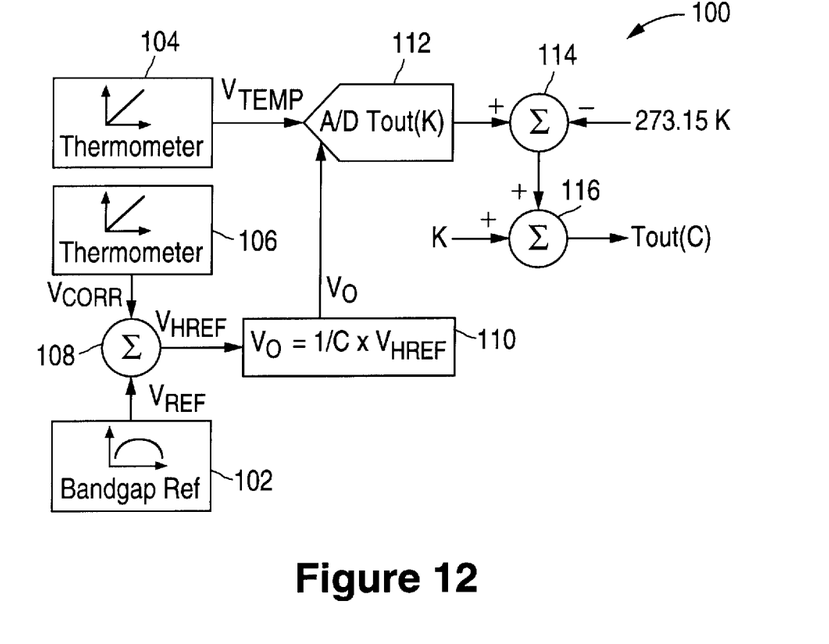
FIG. 12 is a schematic diagram of a digital temperature sensor that generates a linear output temperature signal in accordance with one embodiment of the present invention.

FIG. 12 is a schematic diagram of a digital temperature sensor 100 that generates a linear output temperature signal. Temperature sensor 100 includes a bandgap reference circuit 102 that generates a reference voltage $V_{REF}$. Of course, temperature sensor 100 is not limited to the use of bandgap reference voltage circuit 102 but any type of reference circuit may be used to generate reference voltage $V_{REF}$. For more information regarding other types of reference circuits see, for example, U.S. Pat. No. 4,313,083, entitled "Temperature Compensated IC Voltage Reference," to Holloway and Gilbert, issued January 1982; U.S. Pat. No. 4,099,115, entitled "Constant-Voltage Regulated Power Supply," to Watanabe, Issued July 1978; U.S. Pat. No. 4,088,941, entitled "Voltage-Reference Circuit," to Wheately, Jr., issued May 1978; U.S. Pat. No. 4,068,134, entitled "Barrier Height Voltage Reference," to Tobey, Jr. et al., issued January 1978; U.S. Pat. No. 3,887,863, entitled "Solid-State Regulated Voltage Supply," to Brokaw, issued June 1975; U.S. Pat. No. 3,829,717, entitled "Reference Voltage Compensation for Zener Diode Regulation Circuit," to Harrison, issued Aug. 8, 1974; and U.S. Pat. No. 3,300,710 to Knauss, issued January 1967, all of which are incorporated herein by reference.

A thermometer circuit 104 generates the linearly-temperature-dependent voltage $V_{TEMP}$. A second thermometer circuit 106 generates a correction voltage $V_{CORR}$ that is summed with the reference voltage $V_{REF}$ at summing circuit 108. The correction voltage $V_{CORR}$ corresponds to an extra temperature dependent voltage and is equivalent to replacing the temperature $T_o$ term in equation 16 with the value that was derived in equation 13. Thus, the output signal from summing circuit 108 is the hyperbolic reference voltage $V_{HREF}$. Thermometer circuits 104 and 106 may be PTAT circuits found within a bandgap reference voltage circuit or may be resistance temperature dependent resistors, thermocouples, Zener diodes, and avalanche Zener diodes, or any combination thereof.

The hyperbolic reference voltage $V_{HREF}$, which is the summed reference voltage $V_{REF}$ and correction voltage $V_{CORR}$, is provided to an amplifying circuit 110 that divides the hyperbolic reference voltage $V_{HREF}$ with a scaling factor C. The scaling factor C provided by amplifying circuit 110 is used to generate the $C\beta_{CAL}$ value derived in equation 14. Thus, amplifying circuit 110 generates a voltage output signal $V_o$ that is equivalent to the hyperbolic reference voltage $V_{HREF}$ multiplied by the reciprocal of C.

The voltage output signal $V_o$ from amplifying circuit 110 is used to normalize the linearly-temperature-dependent voltage $V_{TEMP}$ generated by thermometer circuit 104. Thus, both voltage output signal $V_o$ and the linearly-temperature-dependent voltage $V_{TEMP}$ are received by an A/D converter 112 that computes a digital fraction representing the ratio of the two voltages, i.e., $V_{TEMP}/V_o$, to a resolution of N bits. The A/D converter 112 produces a temperature output signal $T_{OUT}(K)$ in degrees Kelvin, which is therefore equivalent to:

$$T_{OUT}(K) = T_{FS}\frac{V_{TEMP}}{V_O} = T_{FS}\left[\frac{C \times V_{TEMP}}{V_{REF} + V_{CORR}}\right]; \qquad \text{equ. 19}$$

where $T_{FS}$ the full scale digital output of the converter in Kelvin and may be chosen, e.g., to be 512 degrees Kelvin.

A summing circuit 114 receives the temperature output signal $T_{OUT}(K)$ from A/D converter 112 and subtracts 273.15° K., which is the Kelvin equivalent of 0° C., to convert the temperature output signal $T_{OUT}(K)$ in degrees Kelvin to degrees Centigrade. Summing circuit 116 is used to add a temperature offset correction term K to the output signal from summing circuit 114 to produce the final temperature output signal $T_{OUT}(C)$ in degrees Centigrade. The temperature offset term K provided by summing circuit 116 is equivalent to the temperature correction offset term as derived in equation 17. The appropriate temperature offset correction term of the temperature sensor can easily be determined by adjusting the temperature sensor at ambient temperature to produce the appropriate output signal. It should be understood that the order of the steps of summing the Kelvin to Centigrade conversion term followed by adding the temperature offset correction term K are illustrative, and the steps may be performed at approximately the same time by the same summing circuit or in reverse order. Moreover, if desired digital temperature sensor 100 may avoid the conversion to degrees Centigrade completely.

The final temperature output signal $T_{OUT}(C)$ produced by digital temperature sensor 100 can therefore be expressed as follows:

$$T_{OUT}(C) = T_{FS}\left[\frac{C \times V_{TEMP}}{V_{REF} + V_{CORR}}\right] - 273.15° \text{ Kelvin} + K. \qquad \text{equ. 20}$$

which is equivalent to equation 18 after being digitized and converted to degrees Centigrade.

The component circuits, including bandgap reference circuit 102, thermometer circuits 104, 106 and the temperature offset correction term K are adjustable. Thus, the parameters of the devices can be adjusted to the desired values in accordance with equation 18 above, using software code loaded onto the chip. Calibrating component circuits of a digital thermometer sensor using software code is well understood by those of ordinary skill in the art. For example, numbers that adjust the reference voltage and the temperature offset may be stored as digital codes in registers on the integrated circuit. The digital codes that adjust analog parameters, such as the reference voltage, may be used to adjust current or voltage levels within the circuit by switching on or off additional voltage or current sources within the circuit, in turn modifying the target parameters. The digital code that stores the offset may be used as an input to an adder or subtractor to adjust the final digital output of the analog to digital converter. These examples are only illustrative, and many other methods of calibration familiar to those of ordinary skill in the art may be used.

Figure 13:
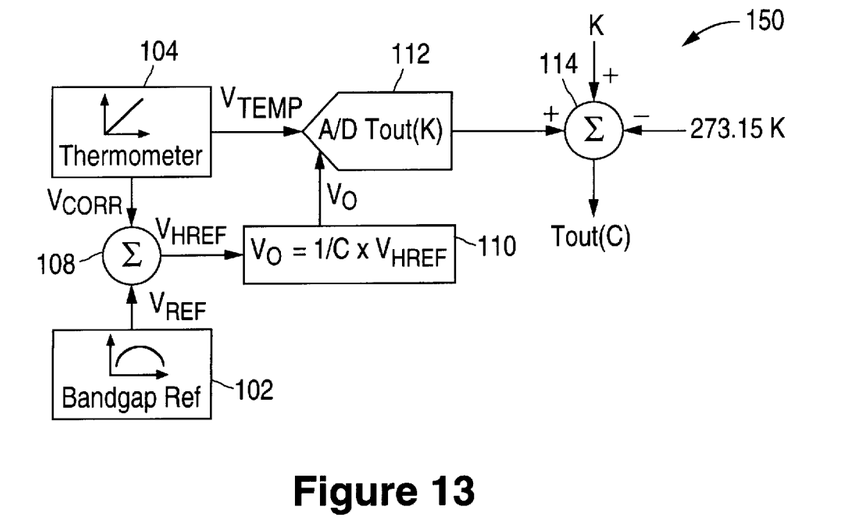
FIG. 13 is a schematic diagram of another digital temperature sensor that generates a linear output temperature signal in accordance with another embodiment of the present invention.

FIG. 13 shows a schematic view of a digital temperature sensor 150 that is similar to digital temperature sensor 100, like designated elements being the same. However, digital temperature sensor 150 advantageously combines the functions of some of the component circuits, such as thermometer circuit 104 and summing circuit 114.

Although the present invention has been described in considerable detail with reference to certain versions thereof, other versions are possible. For example, voltage reference circuits other than bandgap reference voltage circuits may be used to generate the hyperbolic reference voltage $V_{HREF}$. Further, it should be understood that the descriptive equations set forth herein are accurate in the ideal case, and that realized bandgap circuits may depart slightly from this ideal case. Therefore, the spirit and scope of the appended claims should not be limited to the description of the versions depicted in the figures.

What is claimed is:

1. A temperature sensor comprising:
 a reference voltage circuit producing a reference voltage;
 a thermometer circuit producing a temperature dependent correction voltage;
 a first summing circuit coupled to said reference voltage circuit and said thermometer circuit, said first summing circuit producing a voltage output signal that is the sum of said correction voltage and said reference voltage;
 a normalizing circuit receiving said voltage output signal and a temperature dependent voltage;
 an amplifier circuit coupled to said normalizing circuit, said amplifying circuit producing a scaling factor, wherein said normalizing circuit produces a temperature output signal by generating a ratio of said temperature dependent voltage and said voltage output signal multiplied by said scaling factor; and
 a second summing circuit coupled to said normalizing circuit and receiving said temperature output signal, said second summing circuit summing said temperature output signal with a temperature offset correction factor to generate a corrected temperature output signal.

2. The temperature sensor of claim 1, wherein said voltage output signal generated by said first summing circuit has a nonlinear curvature.

3. The temperature sensor of claim 2, wherein said nonlinear curvature is an approximately hyperbolic curvature.

4. The temperature sensor of claim 1, wherein said amplifier circuit is disposed between said first summing circuit and said normalizing circuit.

5. The temperature sensor of claim 1, wherein said amplifier circuit is disposed between said thermometer circuit and said normalizing circuit.

6. The temperature sensor of claim 1, wherein said normalizing circuit is an analog to digital converter circuit, said analog to digital converter circuit producing a digital temperature output signal.

7. The temperature sensor of claim 1, wherein said normalizing circuit receives said temperature dependent voltage from said thermometer circuit.

8. The temperature sensor of claim 1, further comprising a second thermometer circuit, wherein said normalizing circuit receives said temperature dependent voltage from said second thermometer circuit.

9. The temperature sensor of claim 1, wherein said voltage reference circuit is a bandgap voltage reference circuit.

10. The temperature sensor of claim 7, wherein said thermometer circuit is a proportional to absolute temperature circuit.

11. A method of generating a temperature output signal, said method comprising:
providing a first reference voltage;
providing a temperature dependent correction voltage;
summing said reference voltage and said correction voltage together to produce a second reference voltage;
providing a temperature dependent voltage; and
normalizing said temperature dependent voltage as a ratio of said temperature dependent voltage and said second reference voltage to generate a temperature output signal.

12. The method of claim 11, further comprising:
providing a scaling factor, wherein said temperature output signal includes said scaling factor; and
offsetting said temperature output signal by a temperature correction offset factor to generate a corrected temperature output signal.

13. The method of claim 12, wherein said corrected temperature output signal is a digital corrected temperature output signal.

14. The method of claim 11, wherein said second reference voltage has a nonlinear curvature over the operating range of temperatures.

15. The method of claim 14, wherein said nonlinear curvature is an approximately hyperbolic curvature over the operating range of temperatures.

16. The method of claim 14, wherein said second reference voltage has a peak value at a temperature other than ambient temperature.

17. The method of claim 14, wherein said second reference voltage has a peak value at a temperature $T_0$ defined by:

$$T_0 = (T_{CAL}) \exp\left[\frac{V_{GO} + \gamma T_{CAL}}{2V_{GO} + \gamma T_{CAL}}\right]; \text{ where } \gamma \equiv \frac{k}{q}[4 - \alpha - \eta]$$

where $T_{CAL}$ is the calibration temperature, $V_{GO}$ is the bandgap voltage, $\gamma$ is a combined process, device, and operating current temperature coefficient variable, $\alpha$ and $\eta$ are device dependent parameters.

18. The method of claim 12, wherein said scaling factor when multiplied by said temperature dependent voltage is described by:

$$C\beta_{CAL} = \frac{4(V_{GO} + \gamma T_{CAL})^3}{(2V_{GO} + \gamma T_{CAL})^2}$$

where $T_{CAL}$ is the calibration temperature, C is the scaling factor, $\beta_{CAL}$ is temperature dependent voltage at the calibration temperature, $V_{GO}$ is the bandgap voltage, and $\gamma$ is a combined process, device, and operating current temperature coefficient variable.

19. The method of claim 12, wherein said temperature correction offset factor is described by:

$$K = \frac{\gamma(T_{CAL})^2}{2V_{GO} + \gamma T_{CAL}}$$

where K is the temperature offset correction factor, $T_{CAL}$ is the calibration temperature, $V_{GO}$ is the bandgap voltage, and $\gamma$ is a combined process, device, and operating current temperature coefficient variable.

20. The method of claim 12, wherein said corrected temperature output signal is described by a transfer function according to the following:

$$H(T) = \frac{4T(V_{GO} + \gamma T_{CAL})^3}{(2V_{GO} + \gamma T_{CAL})^2 \left[V_{GO} + \gamma T\left(1 + \left(\frac{V_{GO} + \gamma T_{CAL}}{2V_{GO} + \gamma T_{CAL}}\right) + \ln\frac{T_{CAL}}{T}\right)\right]} + \frac{\gamma(T_{CAL})^2}{2V_{GO} + \gamma T_{CAL}}.$$

where T is temperature, $T_{CAL}$ is the calibration temperature, $V_{GO}$ is the bandgap voltage, and $\gamma$ is a combined process, device, and operating current temperature coefficient variable.

21. A temperature sensor comprising:
means for generating a reference voltage having a nonlinear curvature over a temperature range;
means for scaling said reference voltage having a nonlinear curvature to generate a scaled nonlinear reference voltage;
means for generating a temperature dependent voltage;
means for normalizing said temperature dependent voltage with the scaled nonlinear reference voltage to generate a temperature output signal; and
means for adding a constant temperature offset to said temperature output signal to generate a corrected temperature output signal.

22. The temperature sensor of claim 21, wherein said reference voltage having a nonlinear curvature has an approximately hyperbolic curvature.

23. The temperature sensor of claim 21, wherein said means for generating a reference voltage having a nonlinear curvature comprises:
means for generating a reference voltage having a parabolic curvature error over said temperature range;
means for generating a temperature dependent correction voltage; and
means for adding said temperature dependent correction voltage to said reference voltage having a parabolic curvature error.

24. The temperature sensor of claim 23, wherein said means for generating a reference voltage is a bandgap voltage reference circuit, said means for generating a temperature dependent correction voltage is a proportional-to-absolute-temperature voltage circuit, and said means for adding is a summing circuit.

25. The temperature sensor of claim 21, wherein said means for scaling said reference voltage is an amplifier circuit, said means for generating a temperature dependent voltage is a proportional-to-absolute-temperature voltage circuit, said means for normalizing is an analog to digital converter circuit, and said means for adding is a summing circuit.

* * * * *

UNITED STATES PATENT AND TRADEMARK OFFICE
CERTIFICATE OF CORRECTION

PATENT NO.   : 6,183,131 B1                                           Page 1 of 1
DATED        : February 6, 2001
INVENTOR(S)  : Peter R. Holloway, Ravi Subrahamayan and Gary E. Sheehan It is certified that error appears in the above-identified patent and that said Letters Patent is hereby corrected as shown below:

<u>Title page,</u>
Item [75], Peter R. Holloway, Andover, MA (US); Ravi Subrahmayan, Windham;

Gary E. Sheehan, Landonderry, both of NH (US)

Signed and Sealed this

Twentieth Day of November, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,183,131 B1
DATED : February 6, 2001
INVENTOR(S) : Peter R. Holloway, Ravi Subrahamayan and Gary E. Sheehan It is certified that error appears in the above-identified patent and that said Letters Patent is hereby corrected as shown below:

<u>Title page,</u>
Item [75], Peter R. Holloway, Andover, MA (US); Ravi Subrahmayan, Windham;

Gary E. Sheehan, Landonderry, both of NH (US)

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*